(12) United States Patent
Yamato

(10) Patent No.: US 10,334,420 B2
(45) Date of Patent: Jun. 25, 2019

(54) DATA-FLOW CONTROL DEVICE AND DATA-FLOW CONTROL METHOD

(71) Applicant: OMRON Corporation, Kyoto-shi, Kyoto (JP)

(72) Inventor: Tetsuji Yamato, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/084,549

(22) PCT Filed: Jan. 11, 2017

(86) PCT No.: PCT/JP2017/000577
§ 371 (c)(1),
(2) Date: Sep. 12, 2018

(87) PCT Pub. No.: WO2017/159009
PCT Pub. Date: Sep. 21, 2017

(65) Prior Publication Data
US 2019/0090111 A1    Mar. 21, 2019

(30) Foreign Application Priority Data

Mar. 15, 2016   (JP) .................................. 2016-051476

(51) Int. Cl.
*H04W 4/70*      (2018.01)
*H04L 29/08*     (2006.01)
(Continued)

(52) U.S. Cl.
CPC ............. *H04W 4/70* (2018.02); *G01S 5/0009* (2013.01); *G08G 1/22* (2013.01); *H04L 67/125* (2013.01); *H04W 60/04* (2013.01)

(58) Field of Classification Search
CPC ....... H04W 4/70; H04W 60/04; G01S 5/0009; G08G 1/22; H04L 67/125
See application file for complete search history.

(56) References Cited

U.S. PATENT DOCUMENTS 8,755,821 B2 *  6/2014  Brisebois .................. G01S 5/00
                                                  455/456.1
8,819,232 B2 *  8/2014  Bellessort ........... G06F 16/9574
                                                    709/225
(Continued)

FOREIGN PATENT DOCUMENTS

JP      2007-300571 A    11/2007
JP      2008-244810 A    10/2008
(Continued)

OTHER PUBLICATIONS

An International Search Report of PCT/JP2017/000577 dated Mar. 21, 2017.
A Written Opinion of PCT/JP2017/000577 dated Mar. 21, 2017.

*Primary Examiner* — Mohamed Barakat
(74) *Attorney, Agent, or Firm* — Metrolexis Law Group, PLLC

(57) ABSTRACT

This data-flow control device has: a device-side metadata acquisition means that acquires device-side metadata about a plurality of devices; an application-side metadata acquisition means that acquires application-side metadata about an application that uses data provided by a device; a storage means that stores each type of metadata; and a temporary matching means that, when the device-side metadata or the application-side metadata is newly registered, determines and reports whether a temporary pair is present, said temporary pair comprising the newly registered device-side metadata or application-side metadata and counterpart device-side metadata or the application-side metadata that meets a matching condition and was registered prior to the newly registered device-side metadata or application-side metadata.

20 Claims, 7 Drawing Sheets

(51) Int. Cl.
*H04W 60/04* (2009.01)
*G01S 5/00* (2006.01)
*G08G 1/00* (2006.01)

(56) References Cited

U.S. PATENT DOCUMENTS

| | | | |
|---|---|---|---|
| 9,913,311 B1* | 3/2018 | Amerga | H04W 76/14 |
| 10,046,521 B2* | 8/2018 | Walker | G06F 17/50 |
| 10,083,613 B2* | 9/2018 | Atsmon | G08G 1/0112 |
| 2008/0164997 A1 | 7/2008 | Aritsuka et al. | |
| 2008/0243440 A1 | 10/2008 | Matsumoto et al. | |
| 2014/0372561 A1 | 12/2014 | Hisano | |
| 2015/0134727 A1* | 5/2015 | Lee | H04L 67/025 |
| | | | 709/203 |

FOREIGN PATENT DOCUMENTS

| | | |
|---|---|---|
| JP | 2011-180946 A | 9/2011 |
| JP | 5445722 B1 | 3/2014 |
| WO | 2014/041826 A1 | 3/2014 |

\* cited by examiner

FIG. 2

(A) Sensor-side metadata table

| Sensor ID | Network address | Sensing target | Sensing place | Sensing time | Data type | Use range | Consideration | Data history | Temporary matching flag | Temporary pair maintaining flag |
|---|---|---|---|---|---|---|---|---|---|---|
| R001 | ... | Outside air | In front of Kyoto station | 00:00-24:00 | Temperature | Business | At least 100 yen | aa1 produced by A company | ON | OFF |
| R002 | ... | Intersection | Tokyo, A intersection | 00:00- | Still image and moving image | Academic | At least 10 yen | xx1 produced by X company | ON | OFF |
| ... | ... | ... | ... | ... | ... | ... | ... | ... | ... | ... |
| V001 | ... | Passing vehicle | Tokyo, Road between A and B | 00:00-24:00 | Speed | Unlimited | At least 50 yen | yy1 produced by Y company | ON | OFF |
| ... | ... | ... | ... | ... | ... | ... | ... | ... | ... | ... |

(B) Application-side metadata table

| Application ID | Network address | Sensing target | Sensing place | Sensing time | Data type | Use range | Consideration | Data history | Temporary matching flag | Temporary pair maintaining flag |
|---|---|---|---|---|---|---|---|---|---|---|
| A001 | ... | Intersection | Tokyo, A intersection | 9:00 12:00 15:00 | Image | Business | 150 yen or less | — | ON | OFF |
| A002 | ... | Outside air | In front of Kyoto station | 10:00 17:00 | Temperature | Business | 200 yen or less | aa1 produced by A company, aa2 produced by A company, bb1 produced by B company | ON | OFF |
| ... | ... | ... | ... | ... | ... | ... | ... | ... | ... | ... |

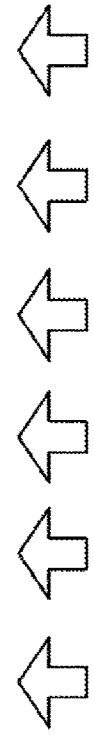

Comparison target items

FIG. 3

| | Sensor information input | |
|---|---|---|
| Sensor ID | R001 | |
| Network address | 10.45.55.11 | |
| Sensing target | Outside air | |
| Sensing place | in front of Kyoto station | |
| Sensing time | 00:00 – 23:59 | |
| Data type | Temperature | |
| Use range | Business | |
| Consideration | At least 100 yen | |
| Data history | aa1 produced by A company | |
| | Normal registration | Temporary matching performance |

FIG. 7

| | |
|---|---|
| Sensor ID | R001 |
| Network address | 10.45.55.11 |
| Sensing target | Outside air |
| Sensing place | in front of Kyoto station |
| Sensing time | 00:00 – 23:59 |
| Data type | Temperature |
| Use range | Business |
| Consideration | At least 100 yen |
| Data history | aa1 produced by A company |

Sensor information input

Hit other party application exists as a result of temporary matching.
Select whether to maintain relationship or
to perform normal registration

[Normal registration] [Maintaining registration] [Cancel]

DATA-FLOW CONTROL DEVICE AND DATA-FLOW CONTROL METHOD

TECHNICAL FIELD

The present invention relates to a technique of controlling a data flow that provides data obtained by a device such as a sensor to an application that uses the data.

BACKGROUND ART

An IT environment called M2M cloud currently attracts attention. Machine to Machine (M2M) indicates a system in which machines having various applications, sizes and performances exchange information over a network. Use of this information can properly control each machine, and analyze a status of a real world. Expectations for practical application are increasing due to improvement of wireless communication technology supporting M2M, miniaturization of a machine, cost reduction, and the like.

What is called M2M cloud is a technology that provides such an M2M technology on a cloud computing environment. A basic function necessary for M2M, such as data collection, accumulation, processing, and analysis, is provided as an application on the cloud, and is usable from anywhere. Reliability and coverage can be improved by collective management of data. For a user, there is an advantage that a required amount of collected data and computer resources can be used. Consequently, an added value can be obtained by analyzing big data without individually constructing a system, and application is expected in a wide range of fields.

As described in Patent Document 1, a technique called a sensor network is studied. Sensor devices (hereinafter, also simply referred to as a sensor) having a sensing function and a communication function are installed in various places, moving bodies, industrial facilities, and the like, and the sensor devices are networked, which allows collection, management, and seamless use of sensing data.

Usually, the sensor is installed to collect data required by an owner. For this reason, the sensor is not often used except when the owner collects the data (the sensor itself is not operated, or the sensing data is not used even if the sensor is operated). The sensing data has low distributability, and the sensing data is limited to the analysis and use by the sensor owner himself no matter how meaningful data for the third party. This leads to duplicate investment of facilities and network congestion by communication with sensors installed by each.

A technology called IoT (Internet of Things) is also studied. A new value is generated by combining pieces of information about many things existing in the world on the net, and seamless development of various services such as social infrastructure is expected. In order to create a value from IoT, it is necessary to know the state of things connected to the net, and sensing and communication are an important element technology.

PRIOR ART DOCUMENTS

Patent Documents

Patent document 1: Japanese Unexamined Patent Application Publication No. 2007-300571
Patent document 2: Japanese Patent No. 5445722

SUMMARY OF THE INVENTION

Problems to be Solved by the Invention

The applicant is extensively studying a technology for appropriately distributing information resource such as the sensing data in a sensor network. For example, a user who wants to provide the sensing data and a user who wants to use the sensing data are linked by appropriately matching data describing information about the sensor and data describing information about the application using the sensing data (see Patent Document 2).

Consequently, for example, the owner of the sensor can obtain a consideration by permitting the data user to temporarily use the sensor or providing the sensing data. For the user, investment for installing the sensor is unnecessary, so that there is an advantage that necessary data can be obtained at low cost.

In the invention described in Patent Document 2, the matching is performed using metadata corresponding to the sensor and metadata corresponding to the application using the sensing data, and a pair of the sensor and the application is generated. However, each piece of metadata includes a lot of pieces of attribute information such as attribute information about the sensor itself, attribute information about a sensing target, and attribute information about the sensing operation, the pair is not established unless the pieces of attribute information are completely matched. That is, there is a problem in that the sensor and the application are not connected depending on the number of pieces of registered metadata.

In order to solve the problem, it is necessary to provide information indicating how the pair is easily established when what condition is set to the user.

Although the sensor network is described as an example, the same problem may arise even in a network that distributes data output (provided) by a device other than the sensor. Examples of the device other than the sensor include an actuator, a controller, a computer, a household electric appliance, a wearable terminal, an automatic ticket gate, a bender machine, and ATM as long as the device outputs some kind of data. In the description, the term "device" is used as a concept encompassing these devices (including the sensor), and a network through which the data output (provided) by the device is distributed is referred to as a device network. Various types of devices exemplified above may be mixed and connected in the device network.

The present invention has been made in view of the above circumstances, and an object of the present invention is to improve an establishment ratio of pairs in the device network that performs the matching of the data provider and the data user.

Means for Solving the Problem

According to one aspect of the present invention, a data-flow control device includes: a device-side metadata acquisition unit that acquires device-side metadata indicating a specification of data that can be provided by a device for each of a plurality of devices; an application-side metadata acquisition unit that acquires application-side metadata indicating a specification of data requested by an application that uses the data provided by the device; a storage that stores the device-side metadata and the application-side metadata; and a temporary matching unit that determines whether a temporary pair exists when one of the device-side metadata and the application-side metadata is newly registered, the temporary pair being a set of the registered device-side metadata or application-side metadata and other party device-side metadata or application-side meta data, in which matching conditions are matched between the registered device-side metadata or application-side metadata and the other party device-side metadata or application-side metadata, the other party device-side metadata or application-side metadata being registered prior to the registered device-side metadata or application-side metadata, and notifies a user who registers the device-side metadata or the application-side metadata of a result of the determination.

According to this configuration, when the user newly registers the metadata, the user can be notified whether the device capable of providing the data satisfying the specification requested by the application exists or whether the application requiring the data provided by the device exists. That is, the information indicating whether the pair of the device and the application is easy to establish can be provided to the user by setting the condition.

The data-flow control device may further include: a matching unit that extracts a combination of the application and a device capable of providing data satisfying the specification required by the application by performing matching processing between the application-side metadata and the device-side metadata; and a data-flow controller that generates a data-flow control command specifying the device and the application extracted by the matching unit. The temporary matching unit performs the determination and the notification prior to the matching processing.

According to this configuration, formal matching is performed, and information can be provided to the user before the data-flow control command is generated.

After notifying the user of the result of the determination, the temporary matching unit may cause the user to select whether the matching processing is performed.

According to this configuration, an opportunity for correcting the content of the metadata can be provided to the user who checks the determination result.

The temporary matching unit may cause the user to select whether the temporary pair is maintained when the temporary pair exists, and the temporary matching unit adds data indicating that the temporary pair is maintained to the device-side metadata and the application-side metadata corresponding to the temporary pair when that the temporary pair is maintained is replied.

According to this configuration, when the temporary pair exists, the pairing can be maintained based on a user's instruction. Consequently, the other party device (application) can be prevented from being previously paired with another user's application (device).

The matching unit may preferentially extract a combination of a device and an application corresponding to the device-side metadata and the application-side metadata to which data indicating that the temporary pair is maintained is added.

According to this configuration, the pieces of metadata on which the temporary pair is established can transfer to a formal combination.

The device-side metadata may include at least one item indicating the specification of data that can be provided by the device, the application-side metadata may include at least one item indicating the specification of data requested by the application, and the matching unit may extract the combination of the device and the application corresponding to the device-side metadata and the application-metadata when all the items of matching targets are matched with each other among the items of the device-side metadata and the application-side metadata.

The device may be a sensor that outputs the sensing data. The data-flow control device of the present invention can be suitably applied to a sensor network constructed with the data provider that provides the sensing data and the data user that uses the sensing data.

The present invention can be specified as a data-flow control device including at least a part of the above units. The present invention can also be specified as a device network system including the data-flow control device. The present invention can also be specified as a data-flow control method including at least a part of the pieces of above processing. The present invention can also be specified as a program causing a computer to perform the above method. The above pieces of processing and units can be freely combined and implemented as long as technical contradiction is not generated.

The device in the present invention means any device that outputs (provides) some kind of data, and examples of the device include a sensor, an actuator, a controller, a computer, a household electric appliance, a wearable terminal, an automatic ticket gate, a bender machine, and ATM. Among others, the present invention is suitable for a sensor network that distributes the sensing data output from the sensor.

Advantages of the Invention

According to the present invention, an establishment rate of pairs can be improved in the device network that performs the matching of the data provider and the data user.

BRIEF DESCRIPTION OF THE DRAWINGS

FIG. 2 is a view illustrating examples of tables in which sensor-side metadata and application-side metadata are stored, respectively.
FIG. 3 is a view illustrating an example of a screen that registers the sensor-side metadata.
FIG. 7 is a view illustrating an example of the screen that registers the sensor-side metadata.

EMBODIMENT OF THE INVENTION

Figure 1:
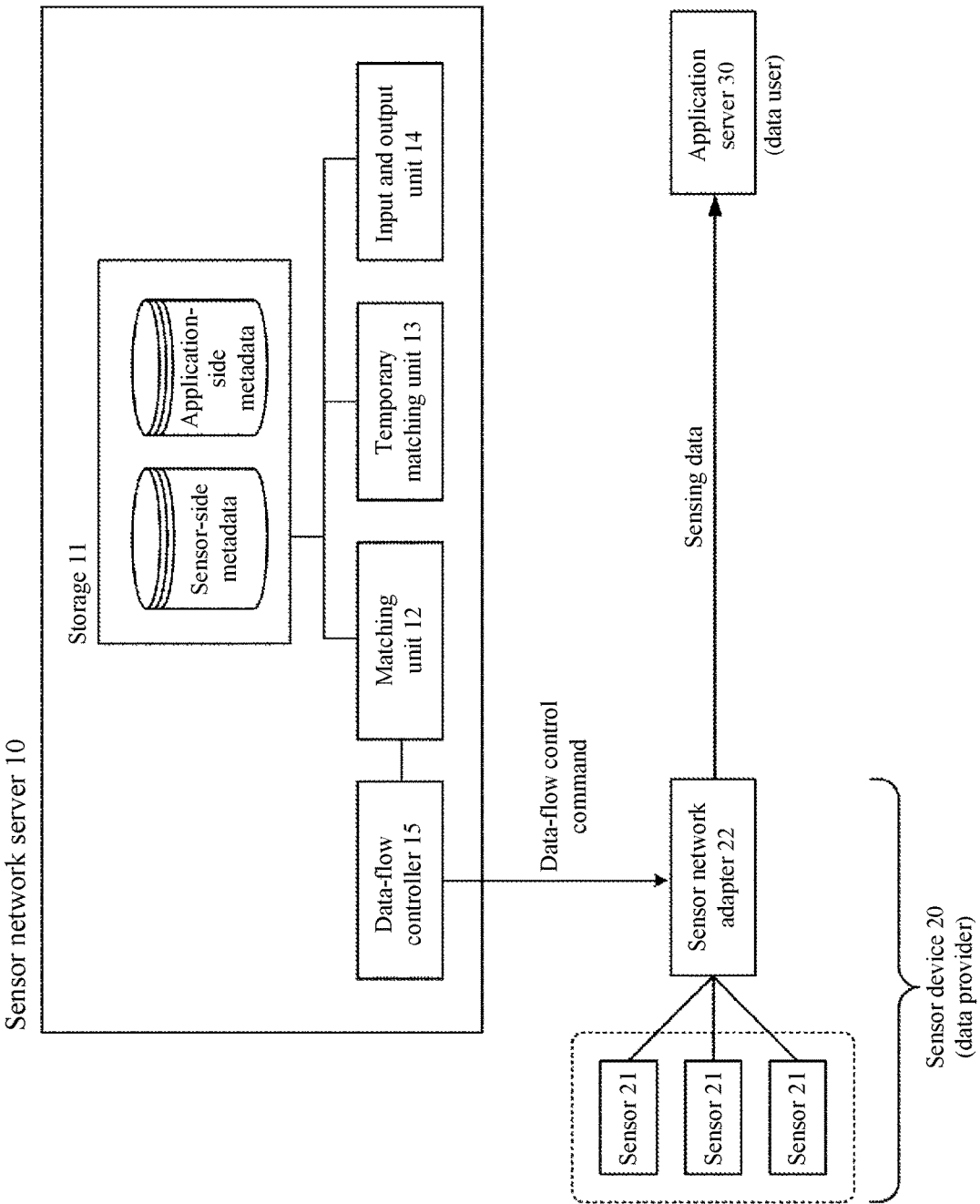
FIG. 1 is a block diagram illustrating a sensor network system according to an embodiment.

Hereinafter, a preferred embodiment of the present invention will be described with reference to the drawings. The description of each component described below should be appropriately changed depending on a configuration of a system to which the present invention is applied and various conditions, and the scope of the present invention is not limited to the following description.

In the following embodiment, an example in which the present invention is applied to a sensor network system using M2M cloud will be described. When such a mechanism is constructed, anyone can easily acquire desired information from a variety of pieces of information obtained from a large number of sensors existing in a sensor network from anywhere, and effective use of the sensor (resource) and distribution of sensing data from a data provider to a data user are expected to be promoted. This system has various applications such as a traffic control system based on the sensing data of a traffic situation, a weather forecasting system based on the sensing data of an environment, various analysis system using big data, maintenance service of the sold sensor by a sensor manufacturer, and the like.

<Entire Configuration of System>

An entire configuration of a sensor network system according to an embodiment of the present invention will be described with reference to FIG. 1. The sensor network system is a system that controls the distribution of the sensing data from the data provider to the data user. The sensor network system includes a sensor device 20 including a plurality of sensors 21 and a sensor network adapter 22 that is a device that manages the sensors 21, an application server 30 having an application that provides service using the sensing data, and a sensor network server 10 that is a data-flow control device that mediates between a provider of sensing data (hereinafter, referred to as a data provider) and a user (hereinafter, referred to as a data user). In the example, the sensor device 20 and the application server 30 are exemplified one by one, but a plurality of sensor devices 20 and a plurality of application servers 30 may be provided.

The devices are communicably connected to each other by a wide area network such as the Internet or a LAN. The network is not limited to a single network but may be considered as a conceptual one in which a plurality of networks having various communication schemes and topologies are connected to each other. That is, any form of network may be used as long as transmission and reception of the sensing data or transmission and reception of data such as metadata relating to the distribution of the sensing data and a data-flow control command can be provided.

(Sensor) The sensor 21 detects a physical quantity to be sensed and a change in physical quantity, and outputs them as sensing data.

Examples of the sensor include an image sensor (such as a monitoring camera), a temperature sensor, a humidity sensor, an illuminance sensor, a force sensor, a sound sensor, an RFID sensor, an infrared sensor, a posture sensor, a rain sensor, a radiation sensor, a gas sensor, an acceleration sensor, a gyroscope, and a GPS sensor. Devices such as a mobile phone, a smart phone, a tablet terminal, a mobile PC, and a drone are equipped with various kinds of sensors, so that these devices can also be handled as a sensor. Any type of sensor including the exemplified sensors can be connected to the sensor network system of the embodiment. Many sensors have already been installed at every place in the world for various applications and purposes such as factory FA, production control, urban traffic control, meteorological environmental measurement, health care, and crime prevention, and these sensors can be connected to the sensor network system of the embodiment. The sensor network system may be constructed with only one type of sensor, or a plurality of types of sensors may be mixed in the sensor network system.

(Sensor Network Adapter)

The sensor network adapter 22 is connected to one or the plurality of sensors 21 so as to be able to communicate with the sensors 21 in a wired or wireless manner. The sensor network adapter 22 manages the sensor 21, acquires the sensing data from the sensor 21, and transmits the sensing data to the sensor network system or application. The sensor network adapter 22 may have a function of performing predetermined processing (for example, signal processing such as noise removal, a calculation such as averaging, sampling, data compression, and time stamp) on the sensing data. The sensor network adapter 22 has a function of communicating with an external device, and is capable of communicating with the application server 30, the sensor network server 10, and the like through a network.

Devices such as a smart phone, a tablet terminal, a mobile PC, a drone, and a wearable terminal are equipped with sensors such as an image sensor, a GPS sensor, an acceleration sensor, and a microphones, and have a function of processing and outputting data obtained by each sensor, and a network communication function. Thus, these devices are an example of a device in which the sensor 21 and the sensor network adapter 22 are physically integrated. In the case that the sensor 21 is equipped with a communication function, the sensor 21 can be connected to the sensor network system alone (that is, with no use of the sensor network adapter 22).

(Application Server)

The application server 30 is a server device in which various application programs providing service using the sensing data are installed. The application server 30 can be constructed with a general-purpose computer including a CPU (processor), a memory, an auxiliary storage device (HDD or the like), a communication device, an input device, and a display device. The application server 30 is installed by a user of the sensing data, and various applications are assumed according to use and purpose.

An application, in which a traffic jam map is generated by collecting a traffic condition at each point from the sensor installed on a road, an in-vehicle terminal mounted on a vehicle traveling on a road, or a smartphone of a driver, and provided to a business operator that uses traffic jam information, can be cited as an example of the application. A video distribution application that collects image data photographed during traveling with a smartphone or an in-vehicle camera and provides a situation at each point to the user, a traveling route search application that searches a traveling route of the vehicle based on the traffic jam information, an application that estimates statistical data of an attribute (such as gender and an age group) of a passer-by from video of a camera installed at specific locations and provides the statistical data as data for various surveys, and an application that a sensor makers performs on-line maintenance on the sold own sensor can also be cited as an example of the application.

(Sensor Network Server)

The sensor network server 10 is a server device that is responsible for matching between the provider of the sensing data and the user, data-flow control of the sensing data from the provider to the user, and the like. The sensor network server 10 is a specific example of the data-flow control device of the present invention. The sensor network server 10 can also be constructed with a general-purpose computer including a CPU (processor), a memory, an auxiliary storage device (HDD etc.), a communication device, an input device, and a display device. The CPU performs a necessary program to implement various functions of the sensor network server 10 (to be described later).

In the sensor network system, a large number (or various kinds of) sensors are networked to enable collection and use of sensing data. In the embodiment, it is assumed that the data provider (sensor 21) provides the sensing data to the data user (application server 30) to obtain a value. Consequently, the data provider obtains opportunities for revenue opportunities, and the user obtains acquisition of inexpensive data. The sensor network server 10 is a server device that mediates a transaction of the sensing data. The sensor network server 10 performs matching between the data provider and the data user to provide the proper distribution of the sensing data.

When the matching between the data provider and the data user is performed, it is not realistic to extract data matched with the desired condition of the data user from a huge amount of sensing data. For this reason, in this system, metadata (sensor-side metadata) describing the specifications, provision conditions and the like of the sensing data are prepared for all the sensors registered in the sensor network, and metadata (hereinafter, referred to as application-side metadata) describing a required specification, a use condition, and the like of the sensing data is used for applications that are the data user. The matching between the data provider (sensor) and the user (application) is properly performed by comparing the pieces of metadata to each other.

In the system configuration example of FIG. 1, the sensor network server 10 includes a storage 11, a matching unit 12, a temporary matching unit 13, an input and output unit 14, and a data-flow controller 15.

The storage 11 is a database that storing the application-side metadata corresponding to all applications registered in the sensor network and the sensor-side metadata corresponding to all sensors registered in the sensor network.

The matching unit 12 performs the matching between the application-side metadata and the sensor-side metadata, which are registered in the storage 11, extracts the sensor capable of providing the sensing data satisfying an application request, and generates a pair of the sensor and the application (performs pairing).

The temporary matching unit 13 checks whether the metadata that can be a pairing candidate exists in the newly registered sensor-side metadata or application-side metadata, and provides information to the user.

Details of the matching unit 12 and the temporary matching unit 13 will be described later.

The input and output unit 14 is interface means for acquiring the sensor-side metadata or the application-side metadata, which are a registration target. The input and output unit 14 is hardware that communicates with an external computer by wired or wireless connection. The input and output unit 14 may include a display device and a human interface device (such as a keyboard and a mouse). In this case, necessity of the communication with the external computer is eliminated. In either case, the information can be provided to the user through the input and output unit 14, and the information can be acquired from the user.

The data-flow controller 15 is a function of generating and transmitting a data-flow control command instructing the transmission of the sensing data based on the information output by the matching unit 12. Details of these functions will be described later.

(Sensor-Side Metadata)

The metadata stored in the storage 11 will be described in detail.

FIG. 2A illustrates an example of the sensor-side metadata stored in the storage 11 in a table form.

The sensor-side metadata is metadata describing attribute information about the sensor, information indicating a specification of the sensing data that the sensor can provide, information indicating the provision condition of the sensing data, and the like. For example, the attribute information about the sensor may include an ID identifying the sensor, a type of the sensor, a network address of the sensor, and an operation history of the sensor. For example, an IP address, a MAC address, and a URI (Uniform Resource Identifier) can be used as the network address. In the case that the sensor is connected to the network through the sensor network adapter 22, the network address of the sensor network adapter 22 may be set.

Examples of the information indicating the specification of the sensing data include a sensing target (that is, what to sense), a location and a region (for example, a position and a range) to be sensed, a sensing time (a time and a time zone at which the sensing data can be acquired), a data type (for example, an image, a moving image, and temperature) of the sensing data, a data format (for example, JPEG and text), a sensing condition (for example, a shutter speed, resolution, and a sampling period), and data reliability.

The information indicating the provision condition of the sensing data is information indicating the transaction condition desired by the data provider. Examples of the information indicating the provision condition of the sensing data include an ID identifying the data provider, a consideration (data providing price), and a usage range and a usage purpose (for example, commercial use unavailable, secondary available).

Information indicating the history of the sensing data (hereinafter, referred to as data history information) can be described in the sensor-side metadata. The data history information is information indicating derivation, details, a source, an origin, an identity, a history, establishment, a responsible person, etc. of the sensing data. Any kind of information may be used as the data history information as long as the information can become an objective material that determines accuracy, quality, reliability, safety, and the like of the sensing data.

A temporary matching flag is a flag indicating whether the metadata is metadata in which temporary matching is permitted. A temporary pair maintaining flag is a flag indicating whether a temporary pair generated by the temporary matching is maintained. Details of both the flags will be described later.

(Application-Side Metadata)

FIG. 2B illustrates an example of the application-side metadata stored in the storage 11 in the table form.

The application-side metadata is metadata describing attribute information about the application, information indicating the specification (required specification) of the sensing data requested by the application, information indicating the use condition of the sensing data, and the like.

For example, the attribute information about the application may include an ID identifying the application, a type of the application, and a network address of the application. For example, an IP address, and a port number can be used as the network address. Examples of the information indicating the required specification of the sensing data include a sensing target, an area to be sensed, a sensing time, a data type of the sensing data, a data format, a sensing condition, and data reliability.

The information indicating the use condition is information indicating the transaction condition desired by the data user. Examples of the information indicating the use condition include an ID identifying the data user, a consideration (upper limit of utilization price of the data), and a use range and a use purpose.

The data history information can also be described in the application-side metadata. A content of the data history information is identical to that of the information described in the sensor-side metadata, so that the description will be omitted. However, the data history information about the provided sensing data is described in the sensor-side metadata, whereas the data history information requested by the application is described in the application-side metadata.

Thus, a plurality of pieces of data history information that permitted by the application can be described in the application-side metadata.

The application-side metadata also includes the temporary matching flag and the temporary pair maintaining flag. The content of the flag is identical to that of the device-side metadata.

(Registration of Metadata)

When the data provider or the data user wishes to provide or use the data, an own computer is connected to the sensor network server 10 to input the content of the metadata. Specifically, access to the input and output unit 14 is obtained through the network, and the information is input according to the screen generated by the input and output unit 14. Consequently, the sensor-side metadata or the application-side metadata is generated and stored in the storage 11. In this example, the data provider generates the sensor-side metadata. However, but the same holds true for the case that the data user generates the application-side metadata.

FIG. 3 illustrates an example of a screen that is displayed when the data provider newly registers the sensor-side metadata. The screen is generated by the input and output unit 14, and output to the computer of the data provider connected to the input and output unit 14.

In the embodiment, the user selects normal registration or temporary matching performance after inputting the content of the metadata. When the user selects the normal registration, the input metadata is registered in the storage 11, and the matching is started.

The sensor network server 10 of the embodiment has (1) a function of pairing the pieces of metadata registered in the storage 11 with each other and generating a data flow from the sensor to the application when the pair is established, and (2) a function of checking whether the counterparty metadata that can become a pairing candidate is registered when the metadata is newly registered in the storage 11 and notifying the user.

Hereinafter, the former is referred to as normal matching, and the latter is referred to as temporary matching. Each piece of processing will be described.

(Normal Matching)

When the user who inputs information presses the normal registration on the screen in FIG. 3, the sensor-side metadata is registered in the storage 11, and the normal matching is performed.

When the metadata is registered by pressing the normal registration, the temporary matching flag and the temporary pair maintaining flag in fields of FIG. 2 are set to OFF.

The normal matching is processing performed by the matching unit 12, and includes comparing the application-side metadata registered in the storage 11 to the sensor-side metadata registered in the storage 11, extracting and paring the application-side metadata and the sensor-side metadata between which the conditions are matched, and issuing a data-flow control command of the sensing data from the corresponding sensor to the corresponding application. The normal matching is performed when the metadata is newly registered.

Figure 4:
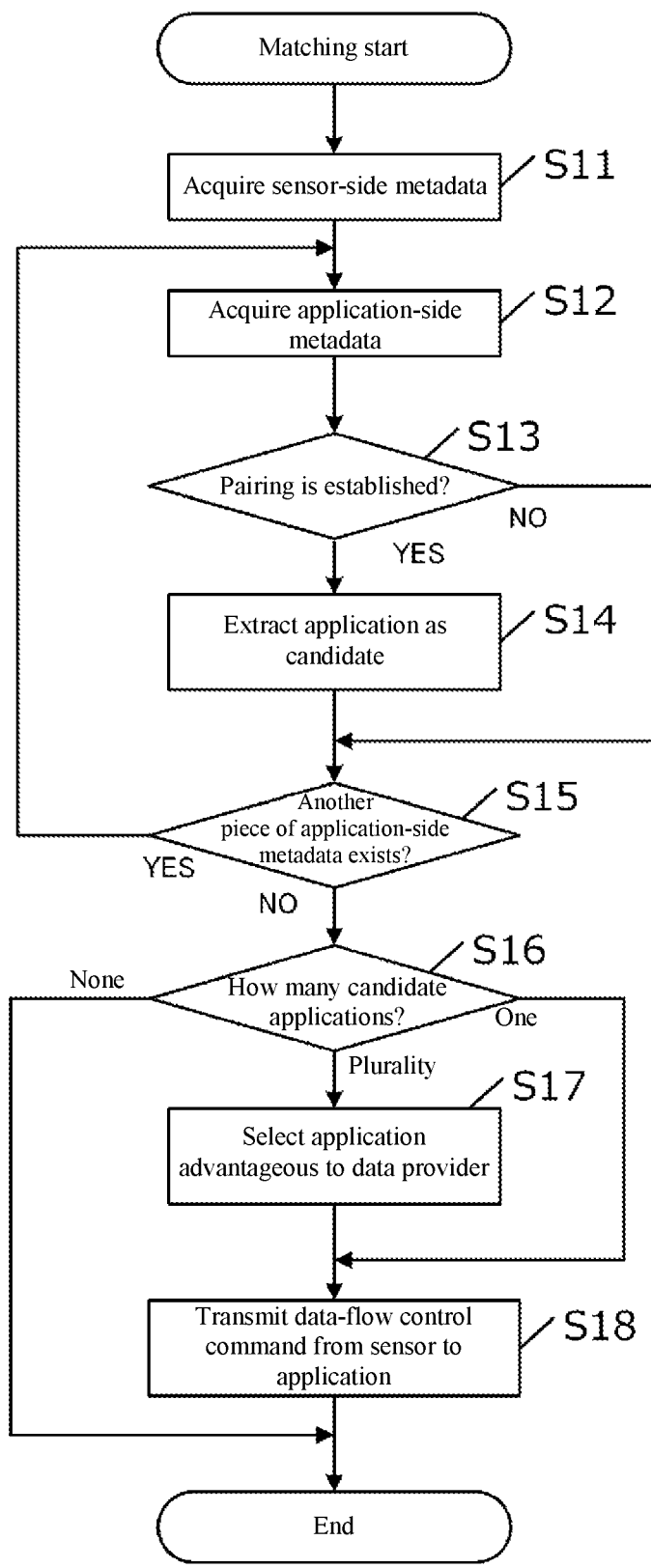
FIG. 4 is a flowchart of normal matching processing.

FIG. 4 is a flowchart of the normal matching that is performed when the sensor-side metadata is registered.

The sensor-side metadata waiting for the processing is acquired one by one from a sensor-side metadata table owned by the storage 11 (step S11).

One piece of application-side metadata is acquired from the application-side metadata table of the storage 11 (step S12). A record in which the temporary matching flag is set to ON does not become an acquisition target in step S12. This point will be described later.

Whether the specification and the transaction condition (provision condition) of the sensing data specified by the application-side metadata satisfy the request specification and the transaction condition (use condition) of the sensing data specified by the sensor-side metadata is determined. The pairing is established when the comparison target items of the sensor-side metadata and the application-side metadata are matched with each other, and pairing is not established when the comparison target items are not matched with each other (step S13).

Whether the conditions are matched with each other is not necessarily determined by complete matching in wording. For example, when the sensing location is "in Kyoto city" on the sensor side and the sensing location is "in front of Kyoto station" on the application side, it is determined that the sensing locations are matched with each other.

When the pairing is established in step S13, the application-side metadata acquired in step S12 is extracted as one of the final pair candidates (step S14).

The pieces of processing in steps S12 to S14 are performed for all the pieces of application-side metadata registered in the application-side metadata table (step S15).

In step S16, the number of pieces of application-side metadata extracted as the candidate is determined.

When a plurality of pieces of application-side metadata extracted as the candidate exist, the matching unit 12 selects the most advantageous application-side metadata for the data provider from the plurality of pieces of application-side metadata (step S17). For example, for a consideration priority, the application-side metadata having the highest data price may be selected. What criteria the application most advantageous to the data provider is selected can appropriately be set.

For no application-side metadata extracted as the candidate, the processing may be ended, or the application-side metadata closest to the data specification, the transaction condition, or the data history information may be recommended. After a predetermined time elapses, the processing in FIG. 4 may be performed again.

Finally, the data-flow controller 15 generates the data-flow control command issuing the instruction to transmit the sensing data to the target sensor, and transmits the data-flow control command to the sensor network adapter 22 that manages the sensor 21 (Step S18).

As illustrated in FIG. 1, the sensor network adapter 22 acquires the necessary sensing data from the sensor 21 based on the data-flow control command, and transmits the sensing data to the corresponding application server 30.

The data-flow control command includes a data-flow control command ID, information identifying the sensor (a sensor ID, a sensor network address), information identifying the application (an application ID, an application network address), and information about time the data is transmitted. However, the data-flow control command may include other pieces of information.

As described above, in order to establish the pair of the sensor and the application, it is necessary that the comparison target item of the sensor-side metadata be matched with the comparison target item of the application-side metadata. That is, the pairing is not established when one comparison target item of the sensor-side metadata is not matched with that of the application-side metadata.

However, for the user who registers the metadata, it is not easy to previously know that the pairing is easily established by setting what kind of condition to each item.

Prior to the normal matching, the sensor network server 10 of the embodiment determines whether the other party metadata that can be paired exists under the currently-input condition to notify the user, thereby solving of the problem. This processing is called the temporary matching.

(Temporary Matching)

When the user who inputs the information presses the temporary matching performance on the screen in FIG. 3, the temporary matching is performed.

The temporary matching is processing performed by the temporary matching unit 13, and is processing of trying matching before the normal matching is performed and notifying the user whether the matched other party metadata exists. In the temporary matching, data-flow control is not performed even if the matched party are found.

Figure 5:
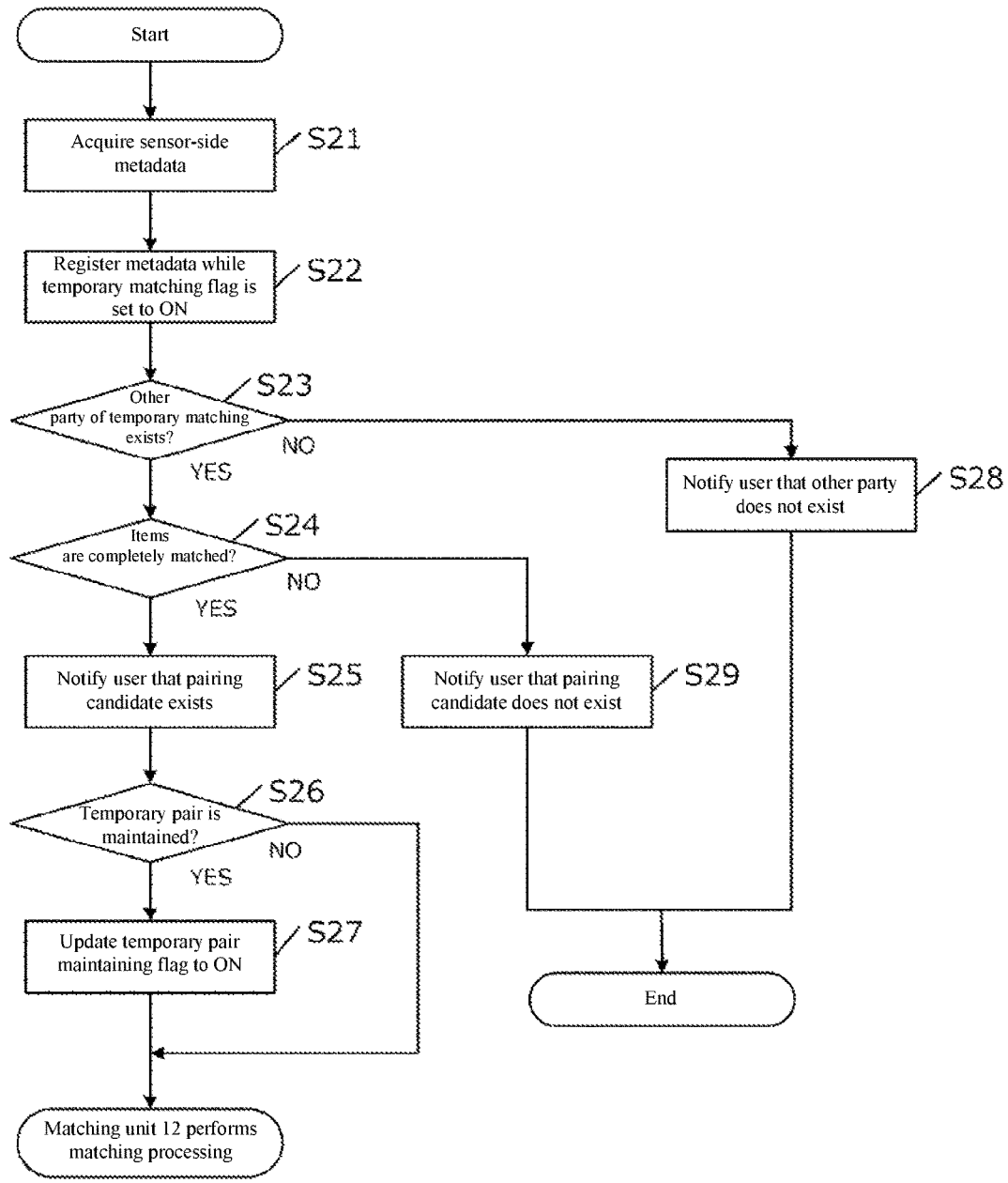
FIG. 5 is a flowchart of temporary matching processing.

FIG. 5 is a flowchart of temporary matching processing. The processing in FIG. 5 is performed in timing when the user presses a temporary matching performance button.

In step S21, the sensor-side metadata input by the user is acquired.

In step S22, the sensor-side metadata is registered in the storage 11. At this point, in the fields in FIG. 2, the temporary matching flag is set to ON and the temporary pair maintaining flag is set to OFF. The temporary matching flag is a flag indicating whether the metadata in which the temporary matching is permitted. The temporary pair maintaining flag will be described later.

In step S23, whether the application-side metadata to be subjected to the temporary matching exists is determined. That is, a record in which the temporary matching flag is set to ON is extracted from the application-side metadata table. In the case that the result does not exist, a notification that there is no partner of temporary matching is made (step S28), and the temporary matching processing is ended.

In step S24, the application-side metadata in which the comparison target item is matched (the matching condition is matched) with the condition input by the user is searched from the pieces of application-side metadata in which the temporary matching flag is set to ON.

Figure 6:
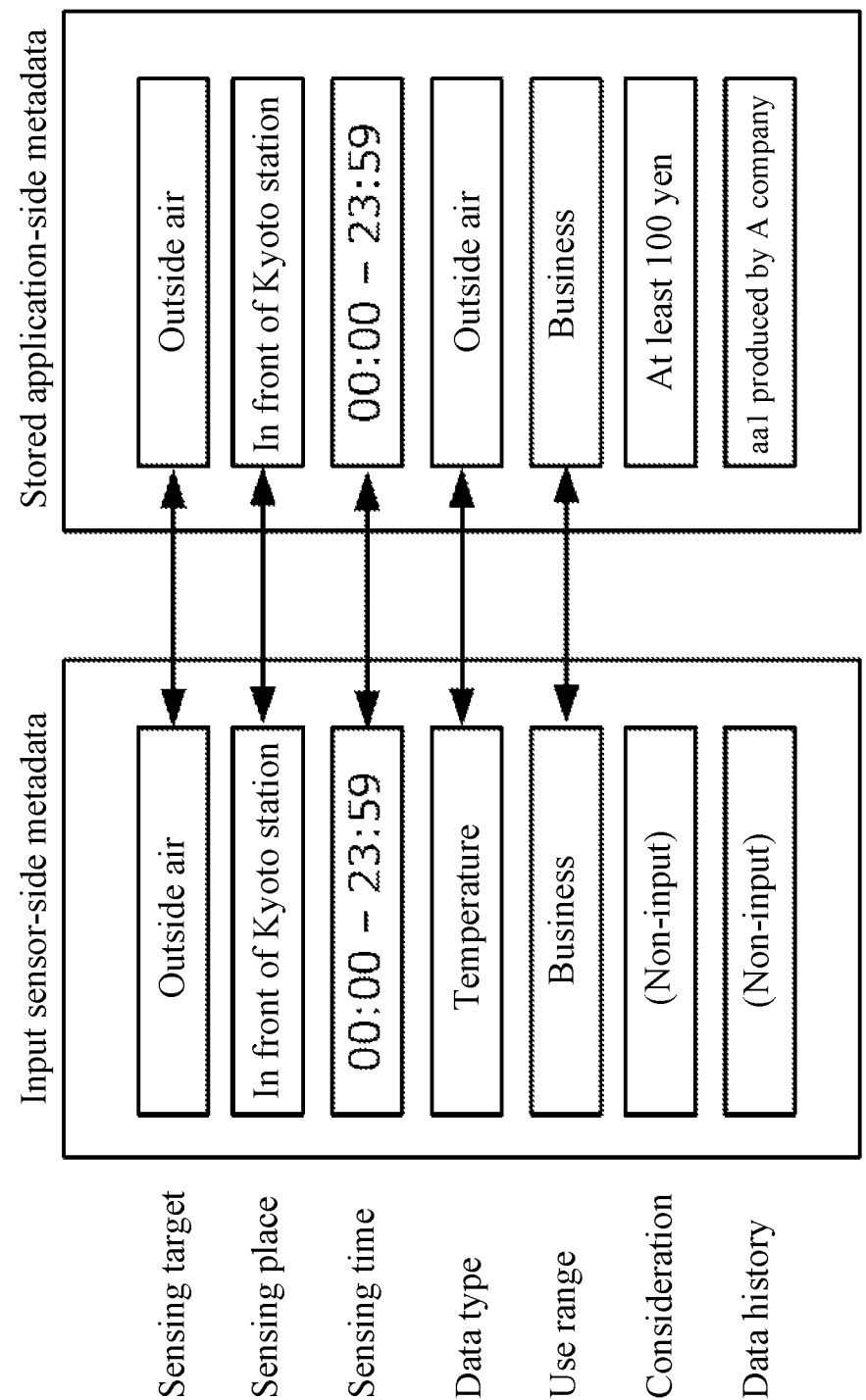
FIG. 6 is a view illustrating matching between pieces of metadata.

For example, as illustrated in FIG. 6, it is assumed that only five items are input in the newly-input sensor-side metadata. In this case, the matching is tried using only the five input items. As a result, in the case that the matched application-side metadata exists, the user is notified that there is a pairing candidate (step S25). Hereinafter, the pair established in the temporary matching is referred to as a temporary pair.

In the case that the matched application-side metadata does not exist, the user is notified that there is no pairing candidate (step S29), and the processing is ended.

In the case that the processing is ended after steps S28 and S29, the input sensor-side metadata may be deleted. Consequently, the condition can be changed to try the temporary matching again.

In the case that the input sensor-side metadata is not deleted, whether the temporary matching flag is set to ON or OFF may be selected. For example, by keeping the temporary matching flag ON, the temporary matching can be performed on the metadata registered by another person, so that an opportunity for establishing the pair of the device and the application can be expected to increase.

FIG. 7 illustrates an example of a screen that is provided to the user when the temporary pair is established in step S25. At this point, the user can make three choices.

First is a method for transferring to normal registration while the result of the temporary matching is a reference only. In this case, when the user presses the normal registration on the screen, the temporary matching processing is ended to transfer to the normal matching (NO in step S26). In this case, the processing in FIG. 3 may immediately be started, or processing start may be waited for in the case that the processing in FIG. 3 is periodically performed.

For the transfer to the normal matching, whether the temporary matching flag is set to ON or OFF may be selected.

The second is a method for securing the other party metadata found by the temporary matching on the spot. The normal matching is performed in timing that is independent of the temporary matching, so that there is a possibility that the other party hit by the temporary matching will be paired with other person's metadata. For this reason, when a temporary pair is established, the sensor network server 10 of the embodiment allows the user to select whether the temporary pair is maintained. When the user presses the maintaining registration on the screen, both the temporary pair maintaining flags of the corresponding pieces of metadata are set to ON (step S27).

When performing the normal matching (step S12), the matching unit 12 does not acquire the metadata in which the temporary pair maintaining flag is set to ON, but separately and preferentially performs the pairing. In this example, the temporary pair maintaining flag is used. Alternatively, information (for example, a sensor ID and an application ID) specifying the other party in which the temporary pair is established may be held.

The third is a method for canceling the registration itself.

As described above, when registering the metadata, the sensor network server of the embodiment checks whether the other party metadata hit under the currently-input condition exists prior to the normal matching, and notifies the user. The temporary matching can be performed under fewer conditions than the normal matching. Consequently, the user can study more preferable conditions based on the result of the temporary matching.

Whether to perform the normal matching or to maintain the relationship obtained by the temporary matching can be selected based on the result of the temporary matching. For example, the normal registration may be performed to obtain the better conditions in the case that the other parties that become the candidates exist sufficiently as a result of the temporary matching, or maintaining registration may be performed to perform the secure pairing in the case that few other parties exist.

In the case that the plurality of pieces of application-side metadata satisfying the condition are extracted in steps S23 and S24, one of the plurality of pieces of application-side metadata may be selected by a predetermined method. For example, the best condition for the data provider may be selected.

The result of the temporary matching may notify the user only whether the other party of the tentative pair exists, or the user may simultaneously be notified of the number of cases that the tentative pair is established.

The sensor-side metadata and the application-side metadata in which the pair is established may be deleted from the storage 11, or a flag indicating that the contract is established is attached and the sensor-side metadata and the application-side metadata may be removed from the matching until the contract is canceled.

(Modifications)

The configuration of the above embodiment is merely one example of the present invention, but is not intended to limit the scope of the present invention. The present invention can adopt various concrete configurations without departing from the technical idea thereof. For example, the data structure and table structure of the above embodiment are an example, and the items may be added or replaced as appropriate.

In the embodiment, the candidate of the other party metadata is selected based on the advantage for the data provider in step S17. However, the method is an example, and the candidate may be selected based on another condition.

In the description of the embodiment, by way of example, the normal matching processing in FIG. 4 is performed with the fact that the sensor-side metadata is newly registered as a trigger. However, the normal matching may be performed with the fact that the application-side metadata is newly registered as a trigger. In this case, the sensor and the application, and the data provider and the data user may be replaced. In the description of the embodiment, the normal matching processing is performed in timing of registering the metadata, but the normal matching processing may periodically be performed.

Similarly, in the description of the embodiment, by way of example, the temporary matching is performed when the sensor-side metadata is newly registered. However, the temporary matching may be performed when the application-side metadata is newly registered. In this case, the sensor and the application, and the data provider and the data user may be replaced.

In the above embodiment, the distribution of the sensing data in the sensor network is exemplified. The present invention is also applicable to the distribution of the data in a device network including a device other than the sensor. Also in that case, the basic configuration of the system is similar to that of the above embodiment, and the sensor in the above embodiment may be read as the device and the sensing data may be read as the data.

The technical idea disclosed in the description can also be specified as the following invention.
(Additional Remark 1)

A data-flow control device including a memory and at least one hardware processor connected to the memory, the memory includes: a device-side metadata storage unit that stores device-side metadata indicating a specification of data that can be provided by a device for each of a plurality of devices; and an application-side metadata storage unit that stores application-side metadata indicating a specification of data requested by an application with respect to an application that uses the data provided by the device, and the at least one hardware processor determines whether a temporary pair exists when one of the device-side metadata and the application-side metadata is newly registered in the memory, the temporary pair being a set of the registered device-side metadata or application-side metadata and other party device-side metadata or application-side meta data, in which matching conditions are matched between the registered device-side metadata or application-side metadata and the other party device-side metadata or application-side metadata, the other party device-side metadata or application-side metadata being registered prior to the registered device-side metadata or application-side metadata, and notifies a user who registers the device-side metadata or the application-side metadata.
(Additional Remark 2)

A data-flow control method causing at least one hardware processor to perform:

a device-side metadata acquisition step of acquiring device-side metadata indicating a specification of data that can be provided by a device for each of a plurality of devices;

an application-side metadata acquisition step of acquiring application-side metadata indicating a specification of data requested by an application with respect to an application that uses the data provided by the device;

a storage step of storing the device-side metadata and the application-side metadata; and a temporary matching step of determining whether a temporary pair exists when one of the device-side metadata and the application-side metadata is newly registered, the temporary pair being a set of the registered device-side metadata or application-side metadata and other party device-side metadata or application-side meta data, in which matching conditions are matched between the registered device-side metadata or application-side metadata and the other party device-side metadata or application-side metadata, the other party device-side metadata or application-side metadata being registered prior to the registered device-side metadata or application-side metadata, and notifying a user who registers the device-side metadata or the application-side metadata.

DESCRIPTION OF REFERENCE SIGNS

10: sensor network server
11: storage
12: matching unit
13: temporary matching unit
14: input and output unit
15: data-flow controller
20: sensor device
21: sensor
22: sensor network adapter
30: application server

The invention claimed is:

1. A data-flow control device comprising:
a memory; and
at least one processor connected to the memory,
wherein the processor is configured to perform operations comprising:
acquiring device-side metadata indicating a specification of data that can be provided by a device for each of a plurality of devices;
acquiring application-side metadata indicating a specification of data requested by an application that uses the data provided by the device;
storing the device-side metadata and the application-side metadata in the memory;
determining whether a temporary pair exists in response to one of the device-side metadata and the application-side metadata being newly registered, the temporary pair being a set of the newly registered device-side metadata or application-side metadata and other party device-side metadata or application-side meta data, in which matching conditions are matched between the newly registered device-side metadata or application-side metadata and the other party device-side metadata or application-side metadata, the other party device-side metadata or application-side metadata being registered prior to the newly registered device-side metadata or application-side metadata; and
providing a notification to a registrant of the device-side metadata or the application-side metadata of a result of the determination.

2. The data-flow control device according to claim 1, wherein the processor is configured to perform operations further comprising:
  extracting a combination of an application and a device capable of providing data satisfying the specification required by the application by performing matching processing between the application-side metadata and the device-side metadata; and
  generating a data-flow control command specifying the extracted device and the application,
  wherein the processor is configured to perform operations such that the determination and the notification are performed prior to the matching processing.

3. The data-flow control device according to claim 2, wherein after providing the notification of the result of the determination, the processor is configured to perform operations further comprising causing a selection of whether the matching processing is performed.

4. The data-flow control device according to claim 2, wherein the processor is configured to perform operations further comprising causing a selection of whether the temporary pair is maintained in response to the temporary pair existing, and adding data indicating that the temporary pair is maintained to the device-side metadata and the application-side metadata corresponding to the temporary pair in response to that the temporary pair being maintained is replied.

5. The data-flow control device according to claim 4, wherein the matching unit is configured to extract a combination of a device and an application corresponding to the device-side metadata and the application-side metadata to which data indicating that the temporary pair is maintained is added.

6. The data-flow control device according to claim 2, wherein the device-side metadata comprises at least one item indicating the specification of data that can be provided by the device,
  the application-side metadata comprises at least one item indicating the specification of data requested by the application, and
  the processor is configured to perform operations further comprising extracting a combination of a device and an application corresponding to the device-side metadata and the application-side metadata in response to all the items of matching targets being matched with each other among the items of the device-side metadata and the application-side metadata.

7. The data-flow control device according to claim 1, wherein the device comprises a sensor configured to output sensing data.

8. The data-flow control device according to claim 3, wherein the processor is configured to perform operations further comprising causing a selection of whether the temporary pair is maintained in response to the temporary pair existing, and adding data indicating that the temporary pair is maintained to the device-side metadata and the application-side metadata corresponding to the temporary pair in response to that the temporary pair being maintained is replied.

9. The data-flow control device according to claim 8, wherein the processor is configured to perform operations further comprising preferentially extracting a combination of a device and an application corresponding to the device-side metadata and the application-side metadata to which data indicating that the temporary pair is maintained is added.

10. The data-flow control device according to claim 3, wherein the device-side metadata comprises at least one item indicating the specification of data that can be provided by the device,
  the application-side metadata comprises at least one item indicating the specification of data requested by the application, and
  the processor is configured to perform operations further comprising extracting a combination of a device and an application corresponding to the device-side metadata and the application-side metadata in response to all the items of matching targets being matched with each other among the items of the device-side metadata and the application-side metadata.

11. The data-flow control device according to claim 4, wherein the device-side metadata comprises at least one item indicating the specification of data that can be provided by the device,
  the application-side metadata comprises at least one item indicating the specification of data requested by the application, and
  the processor is configured to perform operations further comprising extracting a combination of a device and an application corresponding to the device-side metadata and the application-side metadata in response to all the items of matching targets being matched with each other among the items of the device-side metadata and the application-side metadata.

12. The data-flow control device according to claim 5, wherein the device-side metadata comprises at least one item indicating the specification of data that can be provided by the device,
  the application-side metadata comprises at least one item indicating the specification of data requested by the application, and
  the processor is configured to perform operations further comprising extracting a combination of a device and an application corresponding to the device-side metadata and the application-side metadata in response to all the items of matching targets being matched with each other among the items of the device-side metadata and the application-side metadata.

13. The data-flow control device according to claim 2, wherein the device comprises a sensor configured to output sensing data.

14. The data-flow control device according to claim 3, wherein the device comprises a sensor configured to output sensing data.

15. The data-flow control device according to claim 4, wherein the device comprises a sensor configured to output sensing data.

16. The data-flow control device according to claim 5, wherein the device comprises a sensor configured to output sensing data.

17. The data-flow control device according to claim 6, wherein the device comprises a sensor configured to output sensing data.

18. The data-flow control device according to claim 1, wherein the device-side metadata or application-side metadata comprises a flag indicating whether a temporary matching is permitted and
  the processor is configured to perform operations further comprising determining whether the temporary pair exists based on the flag.

19. A data-flow control method comprising:
acquiring device-side metadata indicating a specification of data that can be provided by a device for each of a plurality of devices;
acquiring application-side metadata indicating a specification of data requested by an application that uses the data provided by the device;
storing the device-side metadata and the application-side metadata;
determining whether a temporary pair exists in response to one of the device-side metadata or the application-side metadata being newly registered, the temporary pair being a set of the newly registered device-side metadata or application-side metadata and other party device-side metadata or application-side metadata, in which matching conditions are matched between the newly registered device-side metadata or application-side metadata and the other party device-side metadata or application-side metadata, the other party device-side metadata or application-side metadata being registered prior to the newly registered device-side metadata or application-side metadata; and
notifying a user who registers the device-side metadata or the application-side metadata,
wherein the method is performed by a computer.

20. A non-transitory computer readable storage medium storing a program, which when read and executed, causes a computer to perform operations comprising:
acquiring device-side metadata indicating a specification of data that can be provided by a device for each of a plurality of devices;
acquiring application-side metadata indicating a specification of data requested by an application that uses the data provided by the device;
storing the device-side metadata and the application-side metadata;
determining whether a temporary pair exists in response to one of the device-side metadata or the application-side metadata being newly registered, the temporary pair being a set of the newly registered device-side metadata or application-side metadata and other party device-side metadata or application-side metadata, in which matching conditions are matched between the newly registered device-side metadata or application-side metadata and the other party device-side metadata or application-side metadata, the other party device-side metadata or application-side metadata being registered prior to the newly registered device-side metadata or application-side metadata; and
providing a notification to a registrant of the device-side metadata or the application-side metadata.

* * * * *